(12) United States Patent
Kurematsu et al.

(10) Patent No.: US 9,523,413 B2
(45) Date of Patent: Dec. 20, 2016

(54) CHAIN TENSIONER (71) Applicant: TSUBAKIMOTO CHAIN CO., Osaka-shi, Osaka (JP)

(72) Inventors: Yuji Kurematsu, Osaka (JP); Yuichiro Ishikawa, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 0 days.

(21) Appl. No.: 14/309,036

(22) Filed: Jun. 19, 2014

(65) Prior Publication Data
US 2015/0005120 A1    Jan. 1, 2015

(30) Foreign Application Priority Data

Jun. 26, 2013  (JP) .................................. 2013-133632

(51) Int. Cl.
F16H 7/08   (2006.01)
F16H 7/18   (2006.01)

(52) U.S. Cl.
CPC ......... *F16H 7/08* (2013.01); *F16H 2007/0842* (2013.01); *F16H 2007/0872* (2013.01); *F16H 2007/0878* (2013.01); *F16H 2007/0893* (2013.01); *F16H 2007/185* (2013.01)

(58) Field of Classification Search
CPC ................... F16H 2007/0872; F16H 2007/185
USPC ........................................................ 474/111
See application file for complete search history.

(56) References Cited

U.S. PATENT DOCUMENTS

| 3,358,522 | A | * | 12/1967 | Poyser | F16H 7/08 474/111 |
| 4,524,486 | A | * | 6/1985 | Rios | E05D 5/125 16/381 |
| 5,676,614 | A | | 10/1997 | Inoue et al. | |
| 5,678,281 | A | | 10/1997 | Kamp et al. | |
| 5,782,625 | A | * | 7/1998 | Young | F16H 7/08 474/110 |
| 6,244,981 | B1 | * | 6/2001 | Simpson | F16H 7/0848 474/110 |

(Continued)

FOREIGN PATENT DOCUMENTS

JP    05-187431 A    7/1993
JP    8-291808 A    11/1996

(Continued)

Primary Examiner — William E Dondero
Assistant Examiner — Mark K Buse
(74) Attorney, Agent, or Firm — Westerman, Hattori, Daniels & Adrian, LLP (57) ABSTRACT To provide a simple design chain tensioner that enables formation with fewer components and simplifies assembling process, and is capable of driving a chain stably, thereby reducing wear or occurrence of breakage and improve durability. The chain tensioner 100 includes a chain-drive guide shoe 130 pivotally supported on an arm 120 provided to a tensioner body 110. A bushing part 140 of the chain-drive guide shoe 130 includes a mating hole 141 to mate with a first pin portion 122 that extends from the distal end of the arm 120 to one lateral side, and a guide part 142 guided by a part of a second pin portion 123 that extends to the other lateral side, and a slit 143 wider than a portion of the arm 120 facing the chain-drive guide shoe 130 is provided between the mating hole 141 and the guide part 142.

14 Claims, 11 Drawing Sheets

(56) References Cited

U.S. PATENT DOCUMENTS

| | | | | |
|---|---|---|---|---|
| 6,312,351 | B1* | 11/2001 | Simpson | F16H 7/0848 474/109 |
| 6,406,391 | B1* | 6/2002 | Ullein | F16H 7/08 111/133 |
| 6,454,672 | B2* | 9/2002 | Kurohata | F16H 7/0836 474/111 |
| 6,749,236 | B2* | 6/2004 | Nomura | E05B 85/16 16/412 |
| 7,473,197 | B2* | 1/2009 | Le | F16H 7/08 474/111 |
| 8,092,327 | B2* | 1/2012 | Kobara | F02B 67/06 474/101 |
| 8,387,244 | B2* | 3/2013 | Markley | F01L 1/022 123/90.31 |
| 8,672,785 | B2* | 3/2014 | Young | F16H 7/08 474/111 |
| 2004/0067806 | A1* | 4/2004 | Markley | F16H 7/0848 474/110 |
| 2005/0054467 | A1* | 3/2005 | Le | F16H 7/08 474/111 |
| 2006/0046882 | A1* | 3/2006 | Assel | F16H 7/08 474/111 |
| 2006/0100048 | A1* | 5/2006 | Wake | F16H 7/0831 474/111 |
| 2007/0004544 | A1* | 1/2007 | Mishima | F16H 7/08 474/111 |
| 2009/0111629 | A1* | 4/2009 | Kobara | F02B 67/06 474/111 |
| 2010/0022338 | A1 | 1/2010 | Botez et al. | |

FOREIGN PATENT DOCUMENTS

| | | |
|---|---|---|
| JP | H09119489 A | 5/1997 |
| JP | 2001-55260 A | 2/2001 |
| JP | 2006-132761 A | 5/2006 |
| JP | 2010-107021 A | 5/2010 |

* cited by examiner

Fig. 17

CHAIN TENSIONER

BACKGROUND OF THE INVENTION

1. Field of the Invention

The present invention relates to a chain tensioner having a tensioner body with a plunger bore, a plunger slidably fitted in the plunger bore, an arm provided to the tensioner body, and a guide shoe pressed by the plunger and pivotally supported on the arm.

2. Description of the Related Art

Chain tensioners have hitherto been commonly used for maintaining correct tension in a chain, for example, in a chain guide system that slidably guides a transmission chain such as an endless roller chain passing over respective sprockets of a crankshaft and a cam shaft, or a crankshaft and a drive shaft of an auxiliary machine, inside an engine room, by means of a guide shoe. The chain tensioner is used to tighten a pivoting chain guide having the guide shoe to maintain correct tension.

In such a chain guide system, sometimes it is necessary to install a mechanism for maintaining correct tension in the chain between close-spaced shafts (such as a crankshaft and a drive shaft of an auxiliary machine that are often designed to be close to each other) or in a confined peripheral space.

For such application, there is known a compact integrated chain tensioner with an arm formed on the tensioner body and a guide shoe pivotally supported directly on the arm.

Generally, the common structure for pivotally supporting a guide shoe directly on the arm is a through hole formed both in the guide shoe and arm and a pin passed through these through holes. This structure, however, requires a large number of components, and a large number of process steps during assembly such as alignment of the through holes, insertion of the pin, and retention of the pin, etc.

An alternative structure has been proposed to reduce the number of components and to simplify the assembling process (see, for example, Japanese Patent Application Laid-open Nos. 2010-107021 and 2006-132761), wherein one of the arm and the guide shoe has a pivot pin part to mate with a bushing part formed on the other, so that no separate pin member is required.

SUMMARY OF THE INVENTION

In the chain tensioner described in Japanese Patent Application Laid-open No. 2010-107021, the arm (arm 13, 23) of the tensioner body (12, 22) has a bushing part formed by a through hole (pivot hole 14, 24), while the guide shoe (shoe 15, 25) has pivot pin parts (locking protrusions 18, 28) protruding from both inner sides of a frame (16, 26) having a U-shaped cross section.

This chain tensioner allows simpler assembling because the pivot pin parts (locking protrusions 18, 28) are fitted in the bushing part (pivot hole 14, 24) by elastically deforming the frame (16, 26) with a U-shaped cross section.

In this mechanism, however, the frame (16, 26) with a U-shaped cross section must be elastically deformable to some extent as a prerequisite, because of which the guide shoe (shoe 15, 25) can easily displace relative to the tensioner body (12, 22) during use, meaning that the stabilizing function of preventing vibration or meandering of the chain is compromised.

Repeated deformation or displacement during use would also adversely affect the durability of the guide shoe (shoe 15, 25) itself.

Another commonly known technique of engaging a pivot pin part with a bushing part is to form the bushing part as a tube with a notch, and to fit the pin into the tube by elastically spreading the notch (see, for example, Japanese Patent Application Laid-open Nos. H08-291808 and 2001-055260). This technique, if applied to the structure wherein the guide shoe is pivotally supported directly on the arm, would also lead to poor chain stabilization function because the bushing part would undergo deformation during use and disturb stability of the pivot pin part, and to poor durability due to repeated deformation or displacement of the bushing part during use, as with the chain tensioner of the above-mentioned Japanese Patent Application Laid-open No. 2010-107021.

In the chain tensioner described as Embodiment 1 or 2 of Japanese Patent Application Laid-open No. 2006-132761, the arm (bracket 32) of the tensioner body (3) has a bushing part (pin hole 32*b*) formed by a through hole with a groove (32*c*), while the guide shoe (tensioner arm 2) has a pivot pin part (pivot pin 24) formed with a non-cylindrical surface so that it can pass through the groove (32*c*) at a predetermined angle.

This chain tensioner allows simpler assembling because the pivot pin part (pivot pin 24) is fitted in the bushing part (pin hole 32*b*) at a predetermined angle.

Since this mechanism does not utilize elastic deformation, the problems associated therewith as mentioned above can be solved.

However, since the pivot pin part (pivot pin 24) is formed with a non-cylindrical surface so that it can pass through the groove (32*c*) at a predetermined angle, the sliding area between the pivot pin part (pivot pin 24) and the bushing part (pin hole 32*b*) is small, and so is the cross-sectional area of the pivot pin part (pivot pin 24).

Because of this, there tends to be looseness between the pivot pin part (pivot pin 24) and the bushing part (pin hole 32*b*), leading to poor chain stabilization function, and it would also lead to poor durability because wear is more severe and breakage could easily occur.

In the chain tensioner described as Embodiment 3 or 4 of Japanese Patent Application Laid-open No. 2006-132761, an additional contact surface is provided other than the bushing part and pivot pin part for pivotally and slidably supporting the guide shoe (tensioner arm 2) on the arm (bracket 32) of the tensioner body (3).

In this mechanism, however, it was difficult to form the contact surface in a shape that precisely defines the pivot center as with the bushing part and pivot pin part, because of which looseness could easily occur and the chain stabilization function was reduced.

The present invention is directed at solving these problems and it is an object of the invention is to provide a simple design chain tensioner that enables reduction of components and simplifies assembling process, and is capable of guiding a chain stably without displacement or looseness, thereby to reduce wear or occurrence of breakage and improve durability.

The chain tensioner according to the present invention includes a tensioner body having a plunger bore, a plunger slidably fitted in the plunger bore, an arm provided to the tensioner body, and a guide shoe pressed by the plunger and pivotally supported on the arm. The arm has at a distal end thereof a pivot pin part. The pivot pin part has a first pin portion extending to one lateral side from the distal end of the arm and a second pin portion extending to the other lateral side. The guide shoe has a bushing part pivotally supported by the pivot pin part. The bushing part of the guide shoe has a mating hole to mate with the first pin portion and a guide part guided by part of the second pin portion, and a slit wider than a portion of the arm facing the guide shoe is provided between the mating hole and the guide part, thereby solving the problems described above.

The tensioner body according to the present invention is one that includes a plunger bore. The tensioner body has an arm with a pivot pin part capable of pivotally supporting a bushing part of the guide shoe at a distal end of the arm, the pivot pin part includes a first pin portion extending to one lateral side from the distal end of the arm and a second pin portion extending to the other lateral side, thereby to solve the problems described above.

The guide shoe according to the present invention is pressed by a plunger and pivotally supported on an arm of a tensioner body. The guide shoe has a bushing part pivotally supported by a pivot pin part provided at a distal end of the arm, the bushing part includes a mating hole to mate with part of the pivot pin part at the distal end of the arm and a guide part guided by another part of the pivot pin part, and a slit wider than a portion of the arm facing the guide shoe is provided between the mating hole and the guide part, thereby solving the problems described above.

According to the chain tensioner as set forth in claim 1, or the tensioner body as set forth in claim 7, or the guide shoe as set forth in claim 8, the pivot pin part includes a first pin portion extending to one lateral side from the distal end of the arm and a second pin portion extending to the other lateral side, while the bushing part of the guide shoe includes a mating hole to mate with the first pin portion and a guide part guided by part of the second pin portion, so that the guide shoe is readily attached to the tensioner body by fitting the first pin portion into the mating hole from one side at an angular position where the guide part does not interfere with the arm.

The guide shoe has no elastically deformable parts, and is supported over the most part of its width around a precisely defined pivoting center, by the engagement between the first pin portion and mating hole and by the sliding contact between the second pin portion and guide part. The guide shoe can therefore guide the chain to run stably without displacement or looseness, and can thereby reduce wear and occurrence of breakage and improve durability.

Moreover, the slit wider than a portion of the arm facing the guide shoe provided between the mating hole and the guide part allows the guide shoe to pivot during use without interfering with the arm and allows the guide shoe to pivot in a wider range. Also, the second pin portion supports the guide part in a direction from which most of the force from the chain is applied on the guide part, so that it helps prevent displacement or looseness, and reduce wear or occurrence of breakage, to improve durability.

According to the configuration as set forth in claim 2, part of the arm is positioned inside the slit at a pivoting position where the guide shoe is pressed by the plunger so that displacement of the guide shoe in an axial direction is restricted. As the guide shoe is prevented from moving in the width direction in an event of vibration or meandering of the chain, the chain can run stably. The guide shoe may be secured to the pivoting position during assembly, storage, transportation and the like, so as to prevent the guide shoe from coming off.

According to the configuration as set forth in claim 3, the guide part has an arcuate guide surface guided by the second pin portion, so that the guide part can smoothly slide on the second pin portion, which prevents displacement or looseness and allows the chain to run stably, and helps reduce wear or occurrence of breakage to improve durability.

According to the configuration as set forth in claim 4, the pivot pin part has a rib protruding from an outer circumference of the second pin portion opposite the slit when the guide shoe is pivotally supported. The rib restricts movement of the guide part in which it will come off and prevents movement of the guide shoe in the width direction, whereby the chain can run stably and the guide shoe can be prevented from coming off during assembly, storage, transportation and the like.

According to the configuration as set forth in claim 5, the first pin portion has a diameter decreasing toward a distal end thereof, which allows the first pin portion to be readily fitted into the mating hole of the guide shoe, and thereby facilitates the assembling further.

According to the configuration as set forth in claim 6, the guide shoe includes a guide shoe fixing pin hole that comes to be coaxial with a plunger fixing pin hole at a predetermined pivoting position, so that the plunger and the guide shoe can be fixedly kept in position with a single stopper pin during assembly, storage, transportation, and the like. Thereby, the number of components is further reduced, and the guide shoe can be prevented from coming off during assembly, storage, transportation, and the like.

DESCRIPTION OF THE PREFERRED EMBODIMENTS

The chain tensioner according to the present invention may be embodied in any specific form as long as it includes a tensioner body having a plunger bore, a plunger slidably fitted in the plunger bore, an arm provided to the tensioner body, and a guide shoe pressed by the plunger and pivotally supported on the arm, the arm having a pivot pin part at a distal end thereof, the pivot pin part having a first pin portion extending to one lateral side from the distal end of the arm and a second pin portion extending to the other lateral side, the guide shoe having a bushing part pivotally supported by the pivot pin part, the bushing part of the guide shoe having a mating hole to mate with the first pin portion and a guide part guided by part of the second pin portion, and the bushing part including a slit wider than a portion of the arm facing the guide shoe provided between the mating hole and the guide part, so that the chain tensioner enables reduction of components and simplifies assembling process with a simple design, and is capable of guiding a chain stably without displacement or looseness, thereby to reduce wear or occurrence of breakage and improve durability.

<Embodiment 1>

The chain tensioner 100 according to Embodiment 1 of the present invention includes a tensioner body 110 having a plunger bore 111, a plunger 112 slidably fitted in the plunger bore 111, an arm 120 provided to the tensioner body 110, and a chain-drive guide shoe 130 that is pressed by the plunger 112 and pivotally supported on the arm 120, as shown in FIG. 1 to FIG. 13.

Figure 1:
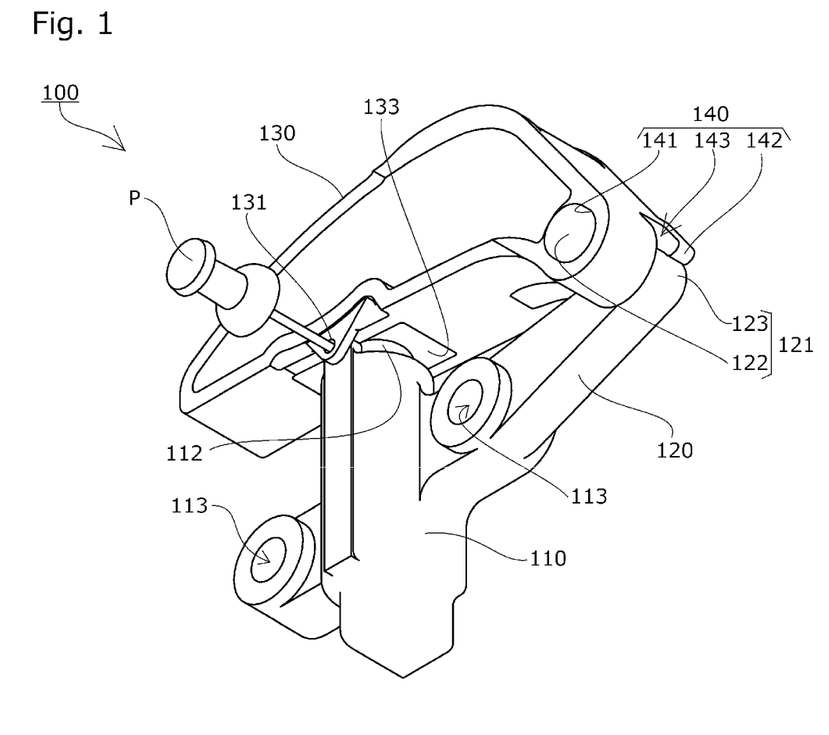
FIG. 1 is a perspective view of a chain tensioner according to Embodiment 1 of the present invention.
Figure 2:
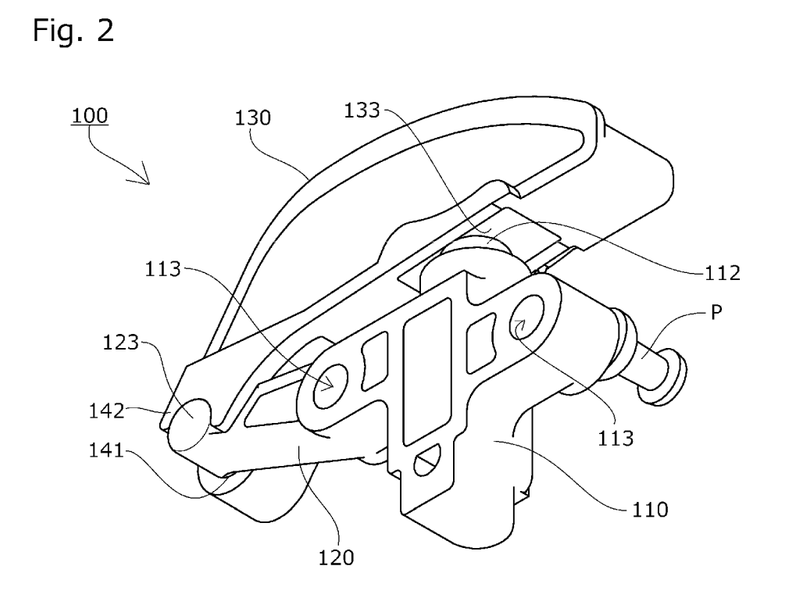
FIG. 2 is a perspective view of the chain tensioner according to Embodiment 1 of the present invention viewed from a different direction.
Figure 3:
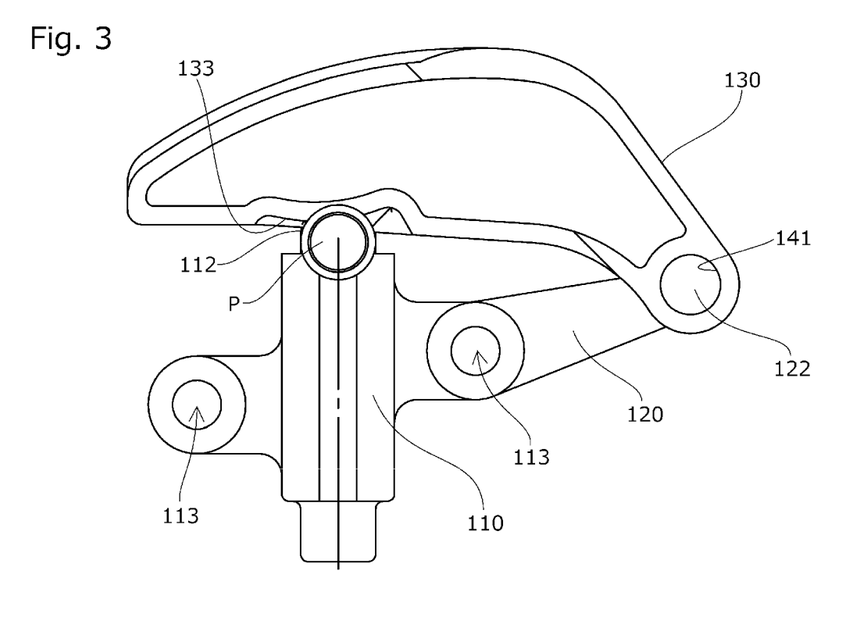
FIG. 3 is a front view of a chain tensioner according to Embodiment 1 of the present invention.
Figure 4:
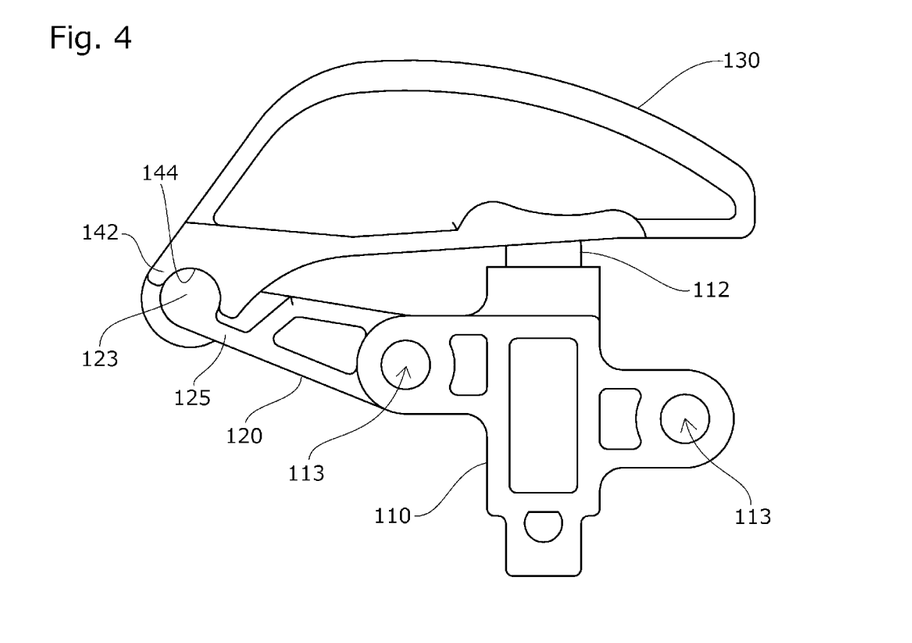
FIG. 4 is a backside view of the chain tensioner according to Embodiment 1 of the present invention.
Figure 5:
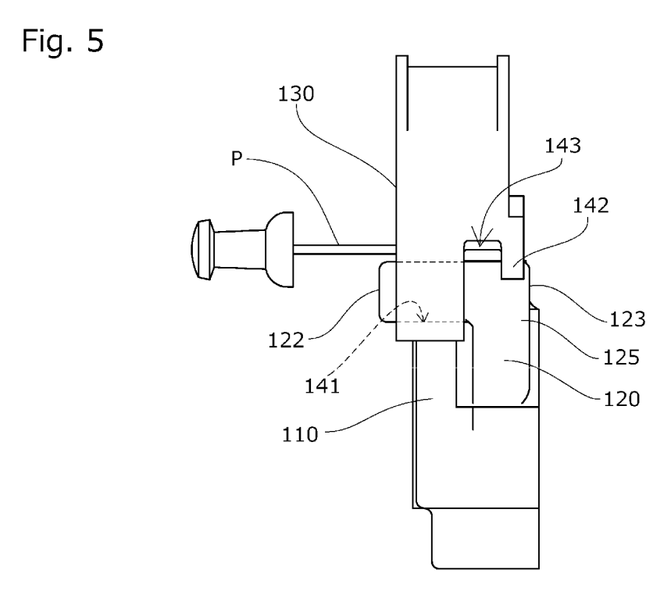
FIG. 5 is a side view of the chain tensioner according to Embodiment 1 of the present invention.
Figure 6:
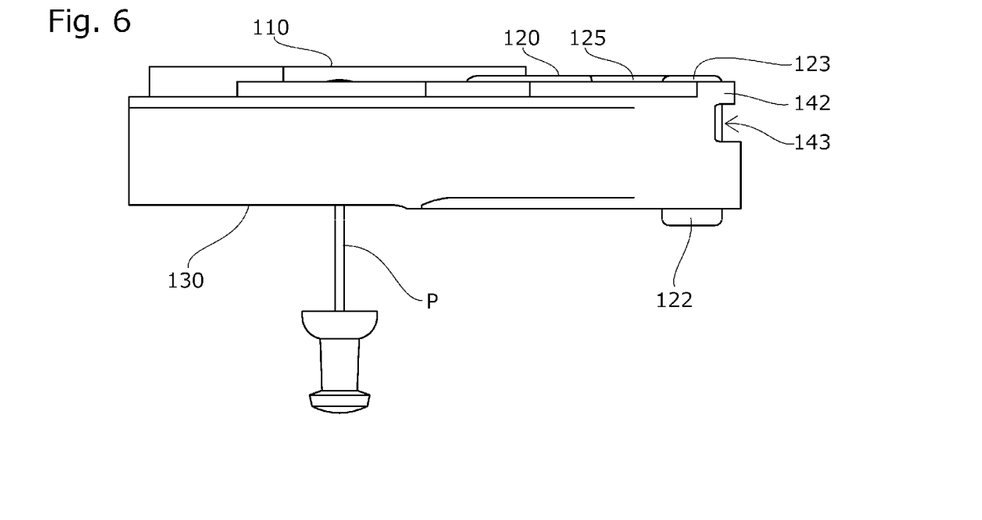
FIG. 6 is a plan view of the chain tensioner according to Embodiment 1 of the present invention.
Figure 7:
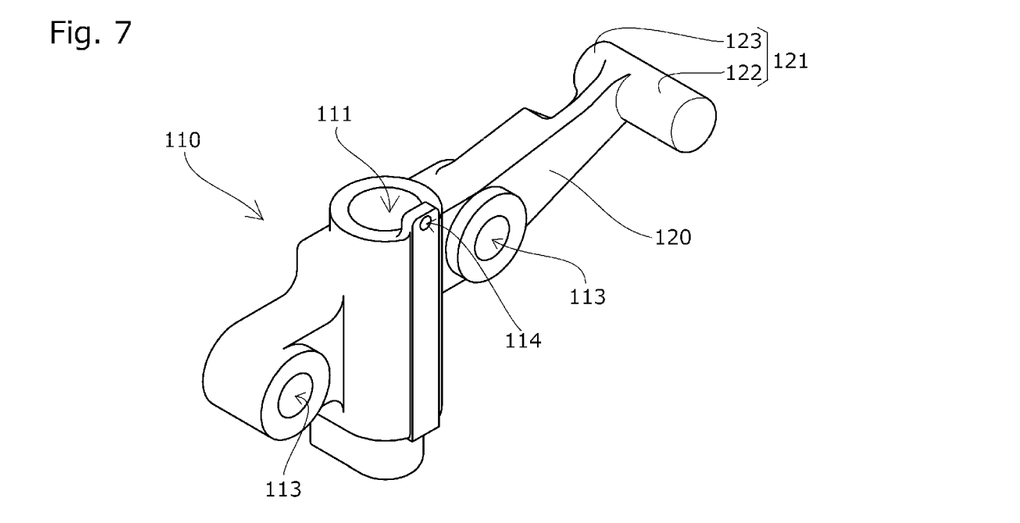
FIG. 7 is a perspective view of a tensioner body according to Embodiment 1 of the present invention.
Figure 8:
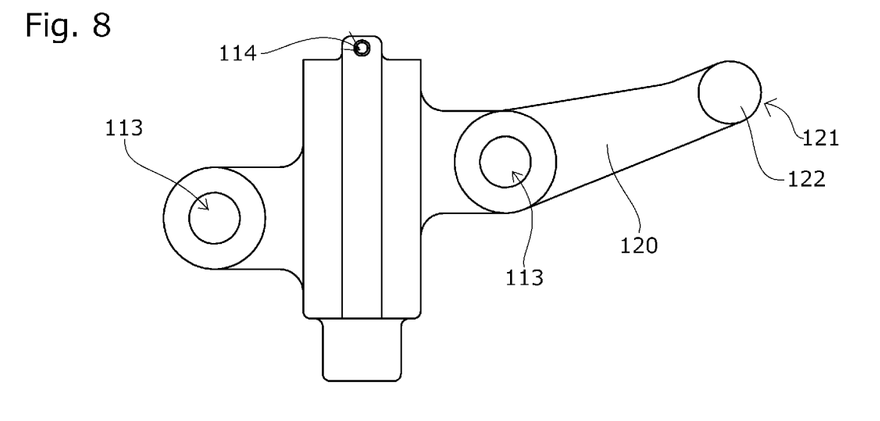
FIG. 8 is a front view of the tensioner body according to Embodiment 1 of the present invention.
Figure 9:
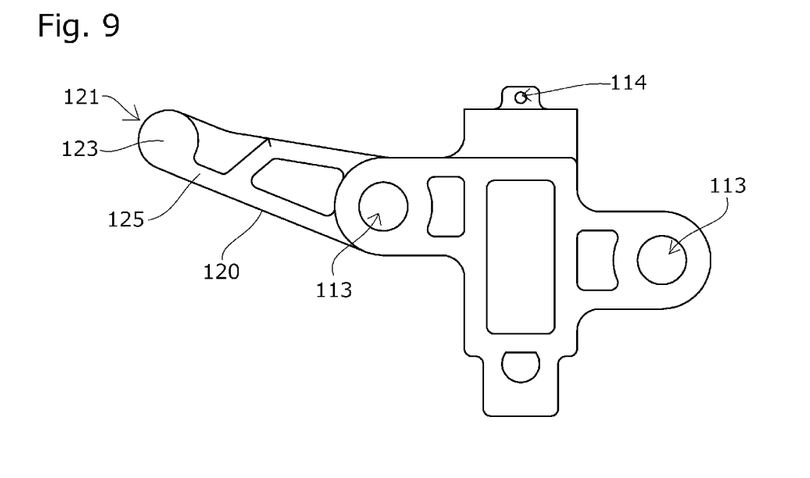
FIG. 9 is a backside view of the tensioner body according to Embodiment 1 of the present invention.
Figure 10:
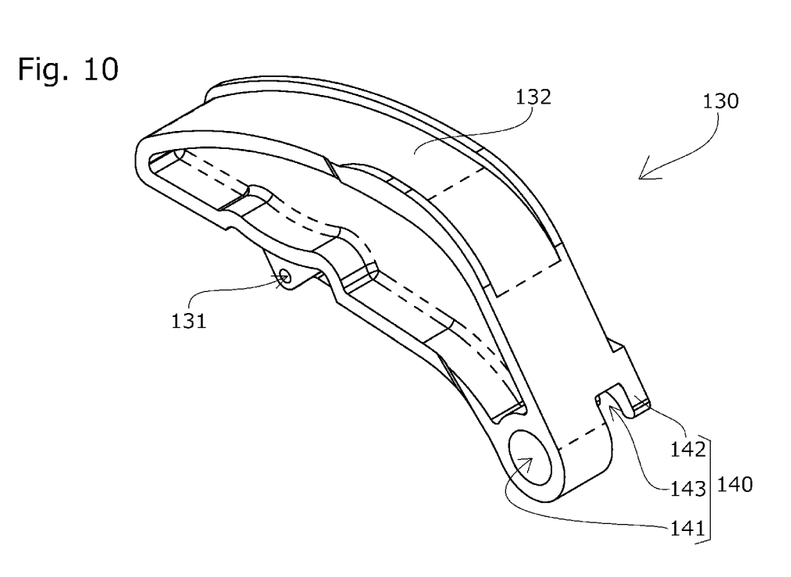
FIG. 10 is a perspective view of a guide shoe according to Embodiment 1 of the present invention.
Figure 11:
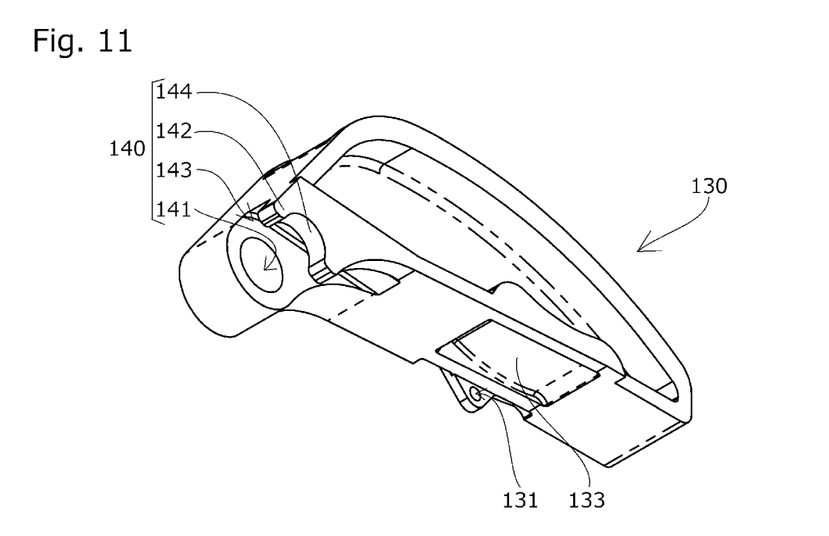
FIG. 11 is a perspective view of the guide shoe according to Embodiment 1 of the present invention viewed from a different direction.
Figure 12:
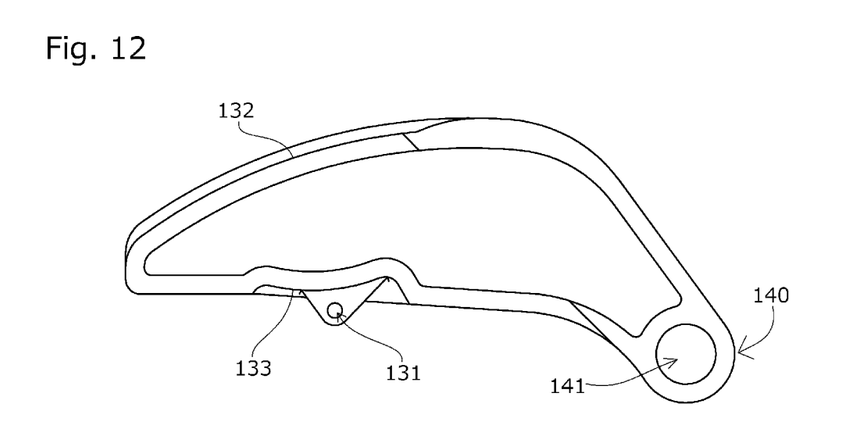
FIG. 12 is a front view of the guide shoe according to the Embodiment 1 of the present invention.
Figure 13:
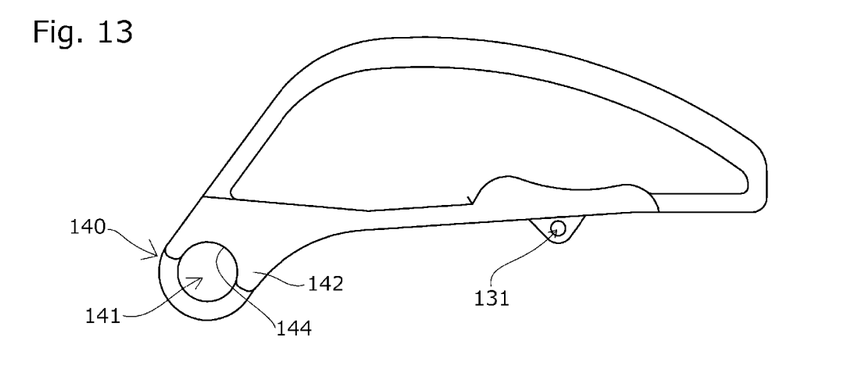
FIG. 13 is a backside view of the guide shoe according to Embodiment 1 of the present invention.

The tensioner body 110 has mounting holes 113 as shown in FIG. 7 to FIG. 9 for bolts or the like to pass through for attachment to the inside of an engine room or the like. The arm 120 extends laterally further from one mounting hole 113.

The arm 120 has a pivot pin part 121 at the distal end.

The pivot pin part 121 includes a first pin portion 122 extending from the distal end of the arm 120 to one lateral side in the width direction of the chain, and a second pin portion 123 extending to the other lateral side.

In this embodiment, the arm 120 and the lower side of the second pin portion 123 are secured with a bottom rib 125 extending over the entire width of the second pin portion 123 so that the pivot pin part 121 at the distal end of the arm 120 has higher overall rigidity.

Near the open end of the plunger bore 111 in the tensioner body 110 is a plunger fixing pin hole 114 to pass a stopper pin P to fix the plunger 112 in position, so that, with the stopper pin P inserted in the plunger fixing pin hole 114, the plunger 112 can be fixedly kept inside the bore during assembly, storage, transportation, and the like.

The chain-drive guide shoe 130 has a bushing part 140 pivotally supported by the pivot pin part 121, as shown in FIG. 10 to FIG. 13.

The bushing part 140 includes a mating hole 141 to mate with the first pin portion 122 of the pivot pin part 121, and a guide part 142 guided by part of the second pin portion 123, with a slit 143 wider than a portion of the arm 120 facing the chain-drive guide shoe 130 provided between the mating hole 141 and the guide part 142.

The guide part 142 has an arcuate guide surface 144 that directly abuts on the second pin portion 123 and is guided as it slides thereon.

In this embodiment, the mating hole 141 extends at least over half the width of the chain guide surface 132 of the chain-drive guide shoe 130, and the arcuate guide surface 144 of the guide part 142 extends almost over a semicircular arc.

On one side of a plunger abutment surface 133 is a guide shoe fixing pin hole 131 that comes to be coaxial with the plunger fixing pin hole 114 at a predetermined pivoting position, so that the plunger 112 and the chain-drive guide shoe 130 can be fixedly kept in position with a single stopper pin P as shown in FIG. 1 to FIG. 6 during assembly, storage, transportation, and the like.

Figure 14:
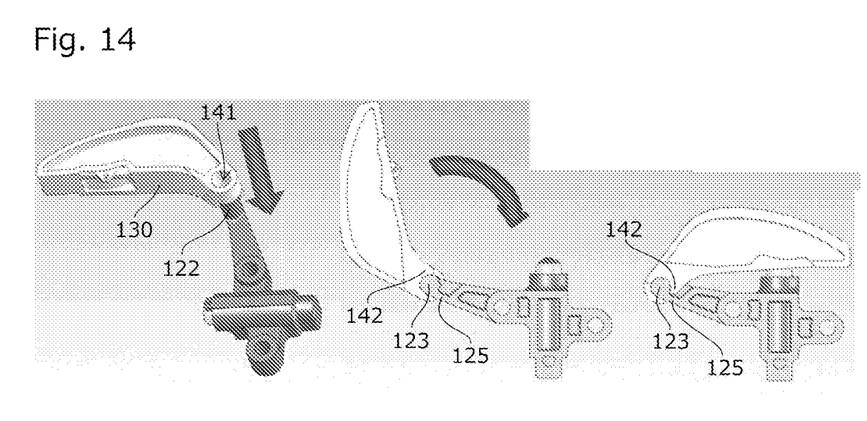
FIG. 14 is a diagram for explaining assembly of the chain tensioner according to Embodiment 1 of the present invention.

The chain tensioner 100 according to Embodiment 1 of the present invention thus configured can be easily assembled as shown in the drawing of FIG. 14 for reference, by fitting the first pin portion 122 in the mating hole 141 from one side at an angular position where the guide part 142 does not interfere with the arm 120, and turning the chain-drive guide shoe 130 onto the plunger 112.

When the plunger abutment surface 133 of the chain-drive guide shoe 130 is in contact with the plunger 112, a portion of the arm 120 facing the chain-drive guide shoe 130 is positioned inside the slit 143 between the mating hole 141 and the guide part 142 so that the guide part 142, by being guided by the arm 120, restricts movement of the chain-drive guide shoe 130 in the width direction and prevents the chain-drive guide shoe 130 from coming off.

The chain-drive guide shoe 130 has no elastically deformable parts, and is supported over the most part of its width around a precisely defined pivoting center, by the engagement between the first pin portion 122 and mating hole 141 and by the sliding contact between the second pin portion 123 and guide part 142. The chain-drive guide shoe 130 can therefore guide the chain to run stably without displacement or looseness, and can thereby reduce wear and occurrence of breakage and improve durability.

With the bottom rib 125 extending over the entire width of the second pin portion 123 positioned such as not to interfere with the guide part 142 even when the chain-drive guide shoe 130 is turned to a position closest to the tensioner body 110 provides higher overall rigidity of the pivot pin part 121 and ensures stable running of the chain.

<Embodiment 2>

Figure 15:
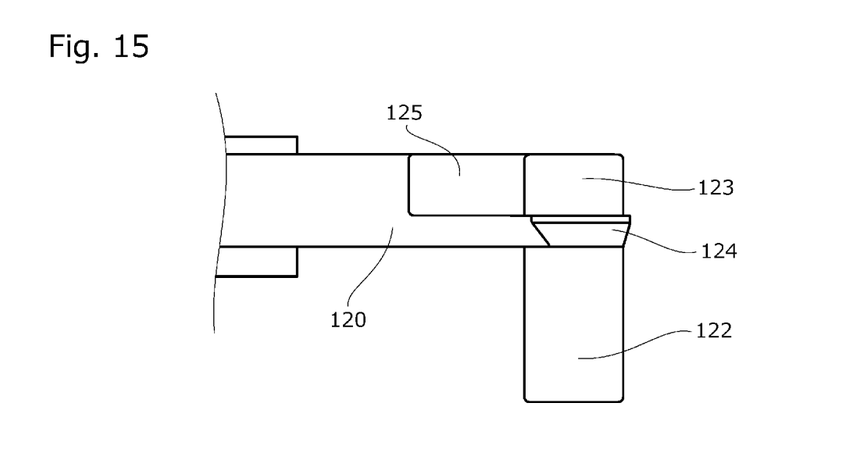
FIG. 15 is a partial plan view of a tensioner body according to Embodiment 2 of the present invention.
Figure 16:
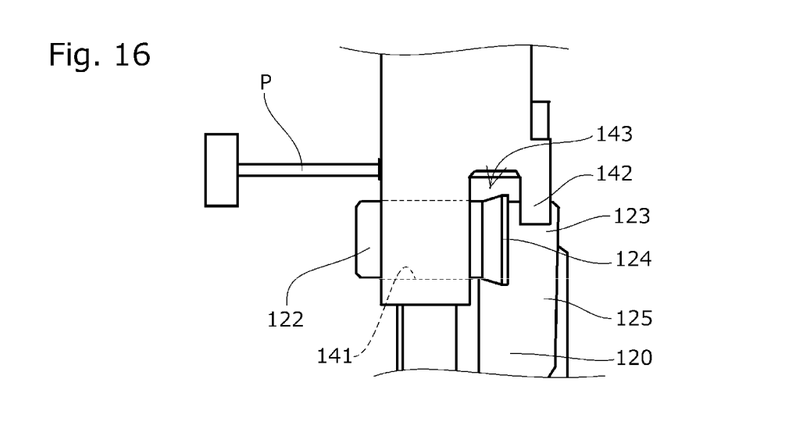
FIG. 16 is a partial side view of the chain tensioner according to Embodiment 2 of the present invention.

In the chain tensioner according to Embodiment 2 of the present invention, as shown in FIG. 15 and FIG. 16, the pivot pin part 121 includes a rib 124 protruding from the outer circumference of the second pin portion 123 opposite the slit 143 where the chain-drive guide shoe 130 is pivotally supported, in addition to the configuration of the chain tensioner 100 according to the previously described Embodiment 1.

In this embodiment, the rib 124 has a tapered surface on the side facing the first pin portion 122, while having a vertical surface on the side facing the second pin portion 123.

When being assembled, the guide part 142 rides over the tapered surface of the rib 124, and after the assembly, the guide part 142 is restricted from moving to the opposite direction by the vertical surface. Therefore, even if the chain tensioner is designed such that the guide part 142 and the arm 120 share a smaller region in the width direction depending on the pivoting angle of the chain-drive guide shoe 130, movement of the chain-drive guide shoe 130 in the width direction during use is reliably restricted, and the chain-drive guide shoe 130 is prevented from coming off.

Although the guide part 142 needs to be elastically deformable so that it can ride over the rib 124 during assembly, the height of the rib 124 may be set such as to tolerate only slight elastic deformation of the guide part 142 that does not cause any deformation or displacement in the chain-drive guide shoe 130 during use.

As with Embodiment 1, the mating hole 141 may extend over at least half the width of the chain guide surface 132 of the chain-drive guide shoe 130 so that most of the load when pivoting is received on the part where the mating hole 141 is formed, whereby the chain can be guided stably without displacement or looseness during use.

<Embodiment 3>

Figure 17:
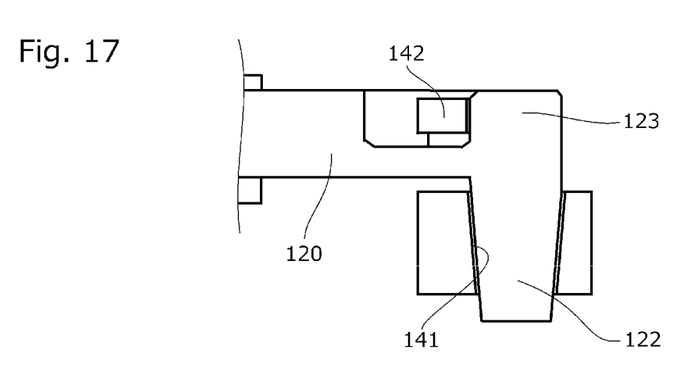
FIG. 17 is a partially cross-sectional plan view of a chain tensioner according to Embodiment 3 of the present invention.

In the chain tensioner according to Embodiment 3 of the present invention, as shown in FIG. 17, the first pin portion 122 is formed to have a diameter decreasing toward the distal end, and the mating hole 141 has a shape corresponding to the first pin portion 122, in addition to the configuration of the chain tensioner 100 according to the previously described Embodiment 1.

The first pin portion 122 can thereby be easily fitted into the mating hole 141 of the chain-drive guide shoe 130, which further facilitates assembling.

As there is more clearance between the mating hole 141 and the first pin portion 122 during insertion, the chain-drive guide shoe 130 can be tilted to some extent. If combined with the design according to Embodiment 2 wherein a rib 124 is provided, the guide part 142 needs even less elastic deformability to ride over the rib 124, and so the chain is guided stably without displacement or looseness during use.

While specific examples of the chain tensioner according to the present invention have been described in the embodiments above, the chain tensioner according to the present invention is not limited to these examples, and the shapes, positions, sizes, and positional relationships with each other of various constituent parts may be changed in various manners.

While the chain tensioner according to the present invention is preferably used in a chain guide mechanism for maintaining correct tension in an endless chain passing over sprockets inside the engine room, it may be applied to any other purposes.

Application of the chain tensioner may not be limited to a chain transmission mechanism but also used for similar transmission mechanisms that use belts, ropes and the like, and can be applied in a variety of industrial fields.

What is claimed is:

1. A chain tensioner, comprising a tensioner body having a plunger bore, a plunger slidably fitted in the plunger bore, an arm provided to the tensioner body, and a guide shoe pressed by the plunger and pivotally supported on the arm, wherein
   the arm has at a distal end thereof a pivot pin part,
   the pivot pin part has a first pin portion extending to one lateral side from the distal end of the arm and a second pin portion extending to the other lateral side,
   the guide shoe has a bushing part pivotally supported by the pivot pin part,
   the bushing part of the guide shoe has a mating hole to mate with the first pin portion and a guide part guided by a part of the second pin portion,
   a slit wider than a portion of the arm facing the guide shoe is provided between the mating hole and the guide part, and
   the mating hole extends across at least over half of a width of the chain guide surface of the guide shoe.

2. The chain tensioner according to claim 1, wherein a part of the arm is positioned inside the slit at least at a pivoting position where the guide shoe is pressed by the plunger so that movement of the guide shoe in an axial direction thereof is restricted.

3. The chain tensioner according to claim 1, wherein the guide part has an arcuate guide surface guided by the second pin portion.

4. The chain tensioner according to claim 1, wherein the pivot pin part has a rib protruding from an outer circumference of the second pin portion opposite the slit when the guide shoe is pivotally supported.

5. The chain tensioner according to claim 1, wherein the first pin portion has a diameter decreasing toward a distal end thereof.

6. The chain tensioner according to claim 1, wherein
   the tensioner body includes a plunger fixing pin hole for a stopper pin to pass through to fix the plunger in position, and
   the guide shoe includes a guide shoe fixing pin hole that comes to be coaxial with the plunger fixing pin hole at a predetermined pivoting position.

7. The chain tensioner according to claim 1, wherein the guide part has an arcuate guide surface guided by the second pin portion.

8. The chain tensioner according to claim 7, wherein said arcuate guide surface is a semicircular arc.

9. A tensioner body having a plunger bore, wherein
   the tensioner body includes at a distal end thereof an arm having a pivot pin part that is capable of pivotally supporting a bushing part of a guide shoe, and
   the pivot pin part has a first pin portion extending to one lateral side from the distal end of the arm and a second pin portion extending to the other lateral side, wherein said arm and a lower side of the second pin portion are secured together via a bottom rib extending across a width of the second pin portion to increase rigidity of the pivot pin part.

10. The tensioner body having a plunger bore according to claim 9, wherein a rib extends across the entire width of the second pin portion.

11. The tensioner body having a plunger bore according to claim 10, wherein said first pin portion is longer than said second pin portion.

12. A guide shoe pressed by a plunger and pivotally supported on an arm of a tensioner body, wherein
   the guide shoe has a bushing part pivotally supported by a pivot pin part provided to a distal end of the arm,
   the bushing part has a mating hole to mate with a part of the pivot pin part provided to the distal end of the arm, and a guide part guided by another part of the pivot pin part,
   a slit wider than a portion of the arm facing the guide shoe is provided between the mating hole and the guide part, and
   the mating hole extends across at least over half of a width of the chain guide surface of the guide shoe.

13. The guide shoe pressed by a plunger and pivotally supported on an arm of a tensioner body according to claim 12, wherein the guide part has an arcuate guide surface guided by the second pin portion.

14. The guide shoe pressed by a plunger and pivotally supported on an arm of a tensioner body according to claim 13, wherein said arcuate guide surface is a semicircular arc.

* * * * *